D. & J. WANDSCHEER.
CORN HARVESTING AND HUSKING MACHINE.
APPLICATION FILED AUG. 15, 1908.
915,912.
Patented Mar. 23, 1909.
3 SHEETS—SHEET 1.
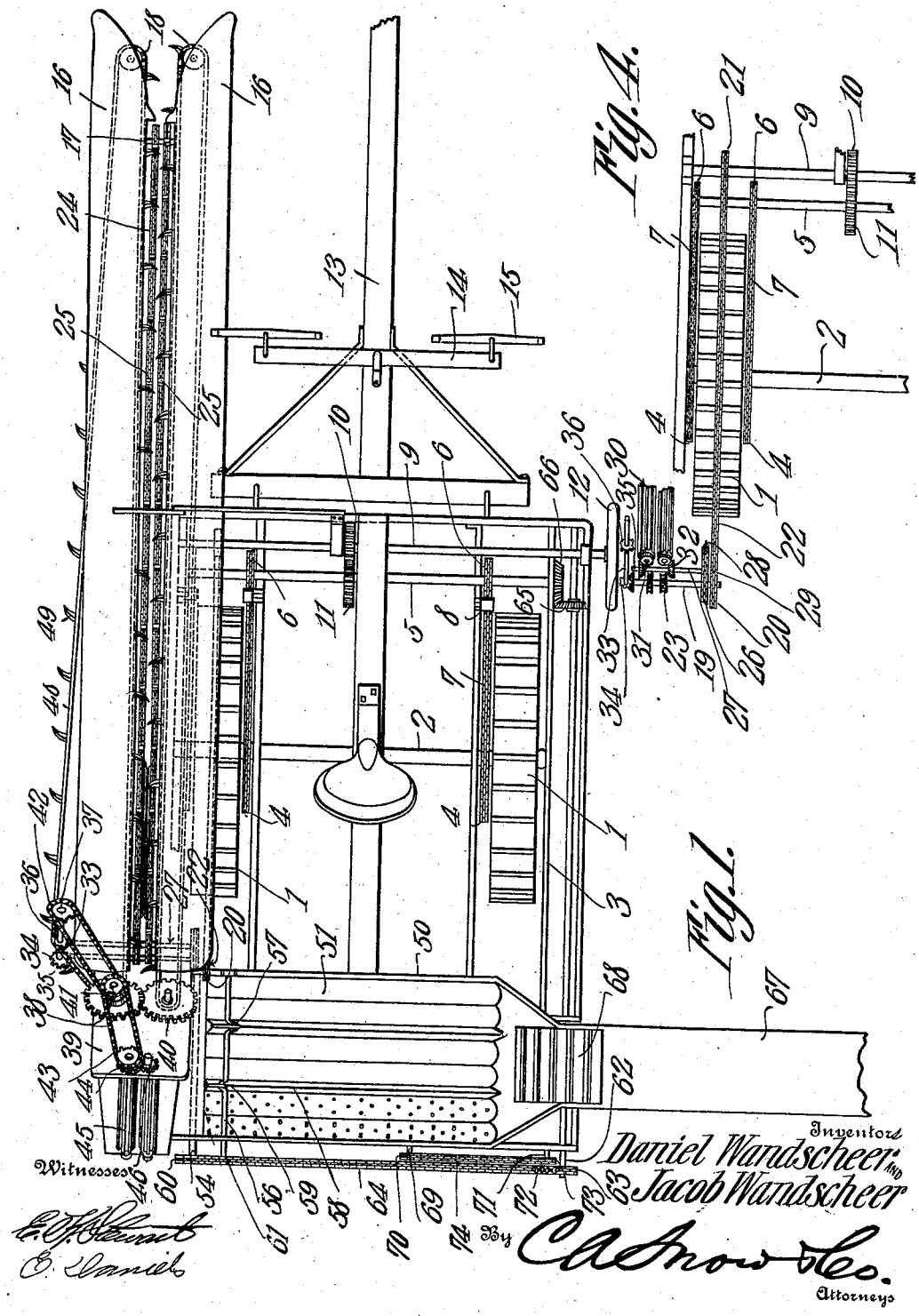

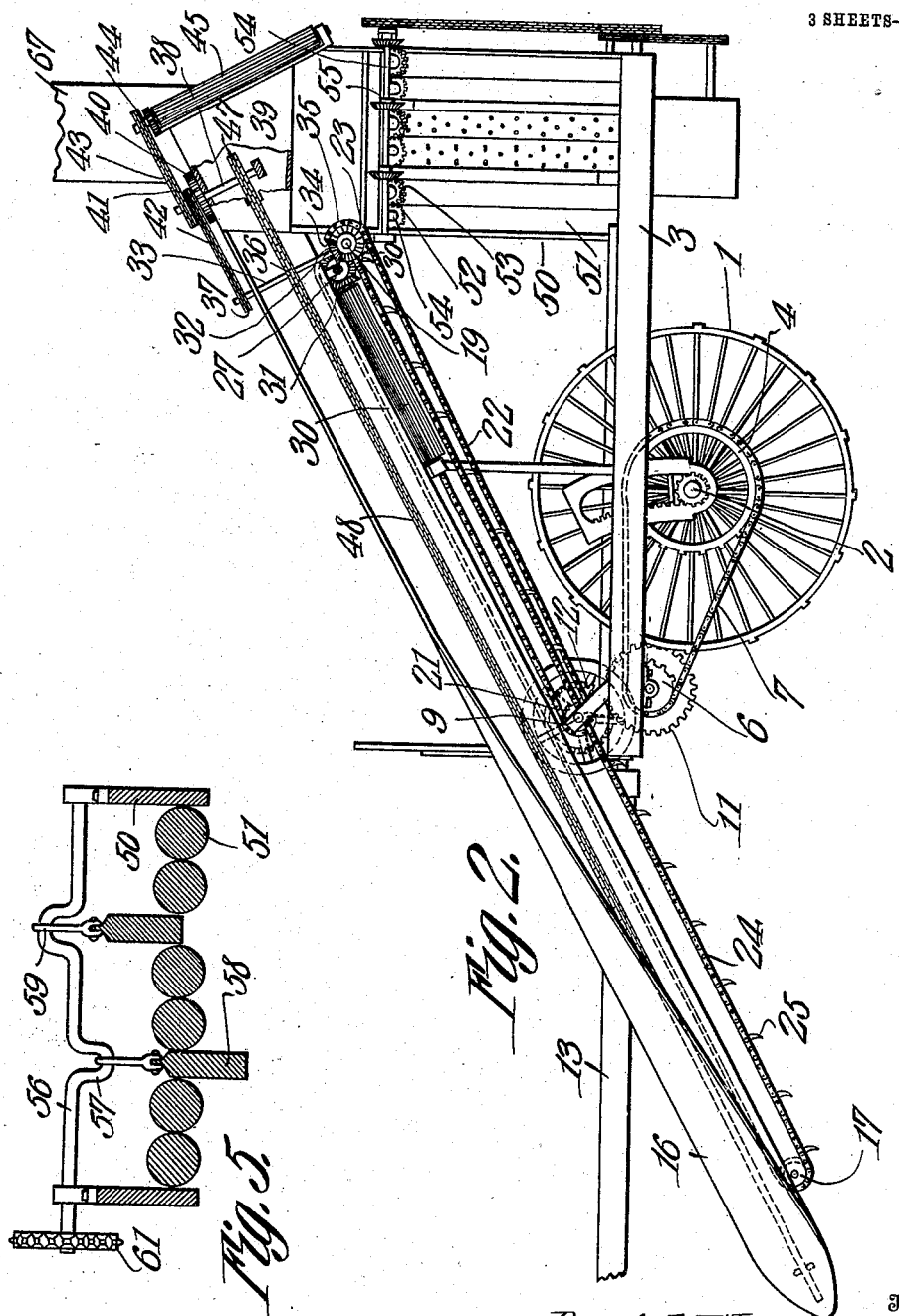

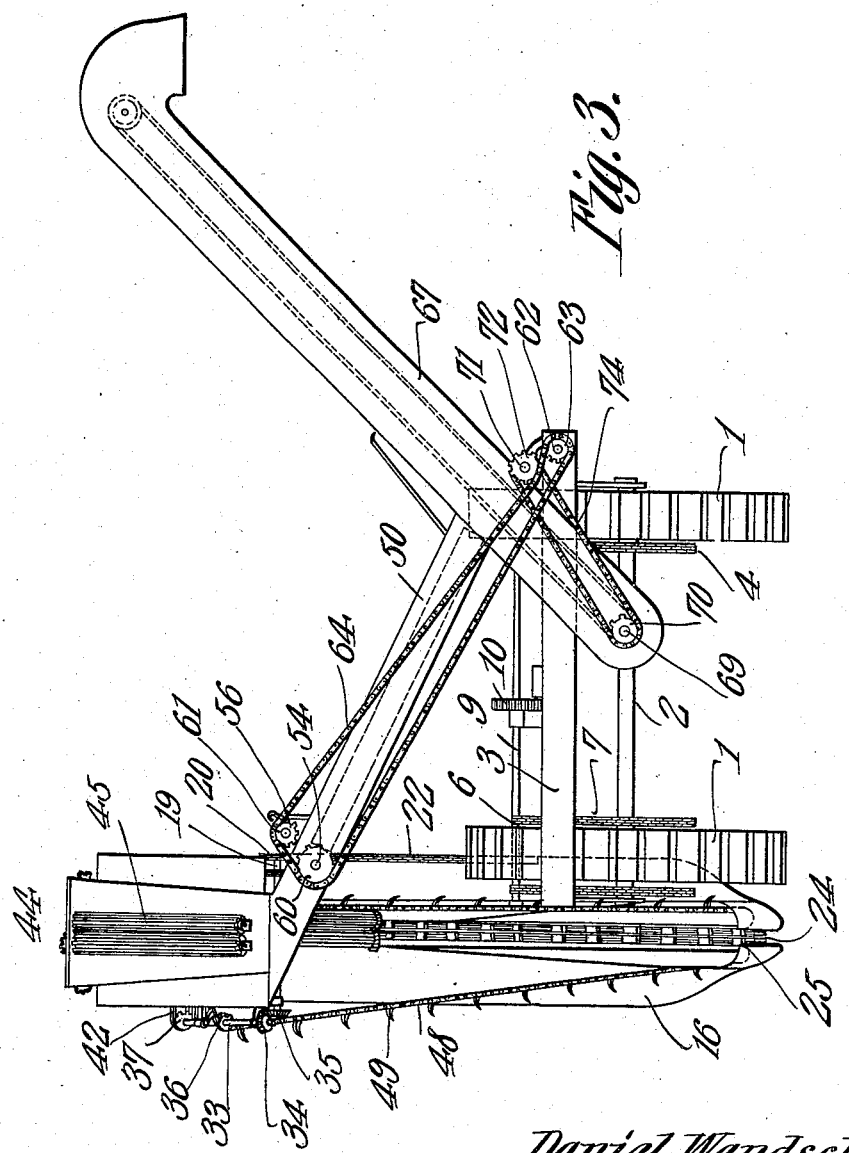

UNITED STATES PATENT OFFICE.

DANIEL WANDSCHEER AND JACOB WANDSCHEER, OF SIOUX CENTER, IOWA.

CORN HARVESTING AND HUSKING MACHINE.

No. 915,912.      Specification of Letters Patent.      Patented March 23, 1909.

Application filed August 15, 1908. Serial No. 448,668.

To all whom it may concern:

Be it known that we, DANIEL WANDSCHEER and JACOB WANDSCHEER, citizens of the United States, residing at Sioux Center, in the county of Sioux, State of Iowa, have invented a new and useful Corn Harvesting and Husking Machine, of which the following is a specification.

This invention has relation to machines for harvesting and husking ear corn, and consists in the novel construction and arrangement of its parts, as hereinafter shown and described.

The object of the invention is to provide a machine of the character indicated, which is adapted to operate upon the stalks as they stand in a row, and which is adapted to separate ears of corn from the said stalks and deposit the same upon husking rolls provided for their reception. During the process of separating the ears from the stalks, much trash, in the way of leaves and other objectionable matter, is also separated from the stalks, and means is provided for ejecting the said objectionable matter from the machine prior to depositing the ears upon the husking rolls.

A further object of the invention is to provide means for distributing the ears of corn evenly over the husking rolls, so that all of the ears may be operated upon in a uniform manner.

With these and other objects in view, the machine consists primarily of a wheel mounted frame upon which is carried a pair of forwardly and downwardly inclined fingers, which are spaced apart at their inner sides. Endless chains are arranged to operate below the inner edges of said fingers and within the spaces between the inner sides thereof, and endless chains are also arranged to operate within the fingers, so that the inner runs of the said chains will be located in the intervening space between the fingers. Stalk-engaging rolls are journaled for rotation under the upper portions of the fingers, and are adapted to engage the standing stalks and draw the same down through the space between the inner sides of the fingers, and also between the said chains above mentioned. Trash-ejecting rolls are journaled for rotation behind the rear ends of the said fingers and are adapted to engage leaves, stalks and other trash, and eject the same from the machine. Downwardly inclined husking rolls are located behind the said fingers. The said rolls are arranged in pairs and the members of the pairs rotate toward each other in the usual manner. Ear-distributing devices are located between each pair of husking rolls and the adjacent pair and are adapted to reciprocate vertically during the operation of distributing the ears over the said rolls.

In the accompanying drawings:—Figure 1 is a top plan view of the corn harvester and husking machine. Fig. 2 is a side elevation of the same. Fig. 3 is a rear elevation of the same. Fig. 4 is a detailed plan view of mechanism for transmitting movement from the traction wheel of the machine to the stalk-engaging rolls and other parts. Fig. 5 is a transverse sectional view through the husking rolls of the machine.

The harvester consists of the traction wheels 1, which are mounted upon the axle 2. The frame 3, is supported upon the said axle 2. The three sprocket-wheels 4, are mounted upon the axle 2, and one of the said sprocket-wheels is located adjacent one of the traction wheels 1, while the other two sprocket-wheels are located at opposite sides of the other traction-wheel 1, which latter traction wheel is adapted to bear the major portion of the weight of the machine. The shaft 5, is journaled for rotation in the frame 3, and is provided with the sprocket-wheels 6. The sprocket-chains 7, pass around the sprocket-wheels 4 and 6, and are adapted to transmit rotary movement from the axle 2, to the shaft 5. The belt-tighteners 8, are mounted upon the frame 3, and bear upon the upper runs of the chains 7, and are adapted to relieve the same of undue slack.

The shaft 9, is journaled for rotation upon the frame 3, and is provided with a gear wheel 10, which meshes with the gear-wheel 11, mounted upon the shaft 5. The shaft 9, is provided at one end with the fly-wheel 12. By reason of the fact that the gear-wheels 10 and 11 intermesh, rotary movement may be transmitted from the shaft 5 to the shaft 9. As will hereinafter appear, motion is transmitted to the movable parts of the corn harvesting mechanism from the shaft 9, while motion is transmitted to the corn husking mechanism from the shaft 5. The fly-wheel 12 is provided in order to impart sufficient momentum to the movable parts as to cause them to operate smoothly and easily when subjected to strains of different tension. The draft tongue 13, is attached to the forward end of the frame 3. The double-tree 14, is mounted upon the tongue 13, and the swingle-trees 15, are attached to the end portions of the said double-tree 14, in the usual manner.

The fingers 12, 16, are mounted upon the frame 3, and are inclined downwardly toward their forward ends. The said fingers are spaced apart at their inner sides. The sprocket-wheels 17 are located at the lower forward ends of the fingers 16, and occupy vertical planes, and lie in the space between the inner sides of the said fingers. The sprocket-wheels 18 are also located at the lower forward ends of the said fingers 16, but the said sprocket-wheels 18 are located in advance of the sprocket-wheels 17. The wheels 18 occupy inclined planes, which are substantially parallel with the plane occupied by the longitudinal axis of the said fingers 16. The shaft 19, is journaled for rotation under the upper rear portions of the said fingers 16. The sprocket-wheel 20 is mounted upon the said shaft 19. A sprocket-wheel 21, is mounted upon the shaft 9, and the sprocket-chain 22, passes around the sprocket-wheels 20 and 21. Thus it will be seen that rotary movement may be transmitted from the shaft 9, to the chain 22, to the shaft 19. The sprocket-wheels 23 are mounted upon the shaft 19, and are substantially in alinement with the sprocket-wheels 17, located at the lower forward ends of the fingers 16. The sprocket-chains 24 pass around the sprocket-wheels 17 and 23, and are provided with the spurs 25. The said sprocket-chains 24 are spaced apart sufficiently to receive between them the stalks of growing corn; but the space between the said chains is not sufficient to permit matured ears of corn to pass therethrough. The sprocket-wheel 26 is mounted upon the shaft 19, adjacent the sprocket-wheel 20. The counter-shaft 27, is also journaled for rotation under the upper rear portion of the fingers 16, and the sprocket-wheel 28 is mounted upon the said counter-shaft 27. The sprocket-chain 29 passes around the sprocket-wheels 26 and 28, and thus rotary movement is transmitted from the shaft 19 to the shaft 27. The stalk-engaging rolls 30, are journaled for rotation under the upper rear portions of the fingers 16, and have their longitudinal axis disposed substantially parallel with the longitudinal axis of the said fingers. The said rolls 30 are provided at their upper ends with the beveled pinions 31, which are enmeshed with the beveled pinions 32, mounted upon the shaft 27. Thus it will be seen that rotary movement may be transmitted from the shaft 27 to the said rolls 30, which are caused to rotate toward each other. The mechanism last above described is best illustrated in Fig. 4 of the drawings.

The shaft 33, is journaled for rotation at the outer side of the outer finger 16, and at the upper rear end portion of the same. The beveled pinion 34, is mounted upon the lower end portion of the shaft 33, and meshes with the beveled pinion 35, which is mounted upon the outer end portion of the shaft 19. Thus it will be seen that rotary movement is transmitted from the shaft 19 to the shaft 33. The sprocket-wheel 36 is mounted upon the shaft 33, at a point intermediate of the ends thereof. The sprocket-wheel 37 is mounted upon the upper end portion of the said shaft 33. The stub-shafts 38, are journaled for rotation in the upper portion of the hood 39, which, in turn, is located at the upper rear ends of the said fingers 16. The intermeshing gear-wheels 40, are mounted upon the shafts 38. The double sprocket-wheel 41, is mounted upon the outer shaft 38, and the sprocket-chain 42, passes around the sprocket-wheel 37, and one of the members of the double sprocket-wheel 41, while the sprocket-chain 43 passes around the other member of the double-sprocket-wheel 41, and the sprocket-wheel 44, mounted upon the upper end of the shaft of one of the trash-expelling rolls 45. The said rolls 45 are journaled for rotation at the rear side of the hood 39, and are adapted to engage leaves, portions of stalks and other trash, carried up by the material which is harvested, and as they rotate toward each other, they are adapted to expel the said objectionable material from the hood 39. The shafts of the said rolls 45, are also provided with the intermeshing gear-wheels 46. Thus it will be seen that rotary movement is transmitted to the said rolls 45, through the sprocket-chain 43, and the sprocket-chain 42. The sprocket-wheels 47, are mounted upon the lower end portions of the stub-shafts 38, and the sprocket-chains 48 pass around the said sprocket-wheels 47, and the sprocket-wheels 18, located at the lower forward ends of the fingers 16. The said sprocket-chains 48, are provided with spurs 49, which upon the inner runs of the said chains 48, are adapted to project into the space between the inner sides of the fingers 16. Thus it will be seen that through the sprocket-chain 42, that rotary movement is transmitted to the stub-shaft 38, which in turn, moves the chains 48 in orbit, occupying inclined planes, and which lie above the chains 25.

The operation of the mechanism above described, which is referred to as the harvesting mechanism, is as follows:—As the implement is drawn along a row of standing stalks, the fingers 16, pass along the opposite side of the said row of stalks. As the spurs 49, carried by the chains 48, engage the stalks, they will swing the same up, so that the lower portions of the said stalks may enter into the space between the chains 24. When the stalks arrive at the lower ends of the rolls 30, they pass between the same, and as the said rolls are rotating toward each other, and are relatively close together, they engage the stalks and pull the same down through the space between the chains 48 and the chains 24. However, the ears which are carried by the stalks, and which are of mature size, cannot pass between the stalk-engaging rolls 30, for the reasons above stated, and consequently the said ears will be pinched from the stalks and will be engaged by the spurs 25, upon the chains 24, and carried up into the hood 39. During the operation of pinching or separating the ears from the stalks as above described, it frequently happens that considerable length of the stalks are separated from the major portions thereof together with the ears. Also leaves and other trash frequently follow the ears. It is desirable to get rid of this objectionable matter, before introducing the ears into or upon the husking rolls, and for this purpose the expelling rolls 45, are provided in the hood 39. When the material enters the said hood 39, the said rolls 45 are liable to engage projecting material, such as leaves and portions of stalks, and as the said rolls are rotated toward each other, they carry the said material between them and leave the ears within the hood 39.

The inclined frame 50, is located upon the frame 3, and the husking rolls 51, are journaled for rotation in the said frame 50. The said rolls 51 may be of any form or configuration, and are arranged in pairs within the said frame, as illustrated in Fig. 1 of the drawing. The members of each pair of husking rolls are provided with intermeshing gear-wheels 52, as shown in Fig. 2 of the drawings, while one member of each pair is provided with a beveled pinion 53. The shaft 54, is journaled for rotation at the upper portion of the frame 50, and extends transversely across the upper ends of the husking rolls 51. The beveled pinions 55, are mounted on the shaft 54, and mesh with the beveled pinion 53, carried by one member of each of the pair of members of the husking rolls 51. The shaft, 56, is journaled for rotation at the upper rear portion of the frame 50, and is located above the husking rolls 51. The shaft 56 is provided at intermediate points with the cranks 57.

An ear-distributer 58, is located between each of the pairs of rolls 51 and the adjacent pair, carried by the frame 50, and each distributer 58, is provided at its upper end with an arm 59, and each arm 59, is pivotally connected with one of the cranks 57, of the shaft 56. The lower ends of the distributers 58 may rest loosely upon cross-pieces (not shown). Thus it will be seen that as the shaft 56 rotates the upper portions of the ear-distributers 58 will be caused to reciprocate in vertical planes, between the pairs of husking rolls, and this movement on the part of the said distributers 58, will have a tendency to spread the ears of corn evenly over the said several pairs of rolls 51, as the said ears are passed from the hood 39, into the frame 50.

The sprocket-wheel 60, is located upon the shaft 54, and the sprocket-wheel 61 is located upon the shaft 56. The said sprocket-wheels occupy the same plane. The shaft 62, is journaled for rotation at the side of the frame 3, and is provided with a sprocket-wheel 63. The sprocket-chain 64 passes around the sprocket-wheels 60, 61 and 63. The forward end portion of the shaft 62 is provided with a beveled pinion 65, which meshes with the beveled pinion 66, located upon the end of the shaft 5. Thus it will be seen that rotary movement will be transmitted from the shaft 5 through the shaft 62, and sprocket-chains 64, to the shaft 54, and the parts carried thereby, and shaft 56, and from the said shaft 56 the said movement is transformed into vertical reciprocatory movement on the part of the ear-distributers 58, as above described.

The conveyer trunk 67, is located at the lower end of the frame 50, and the endless belt 68, is arranged to traverse the length of the said trunk. The lower end of the said belt 68 passes around the shaft 69, which is provided at its rear end with a sprocket-wheel 70.

The stub-shaft 71 is journaled for rotation at the rear end of the frame 3, and the sprocket-wheel 72 is mounted upon the said shaft 71. The said sprocket wheel 72 bears laterally against the upper run of the chain 64, and is adapted to be rotated by the same. The sprocket-wheel 73 is mounted upon the stub-shaft 71, and the sprocket-chain 74 passes around the sprocket-wheels 70 and 73. Thus it will be seen that rotary movement is transmitted to the shaft 69, which in turn will actuate the endless belt-conveyer 68, which travels the length of the trunk 67. Thus it will be seen that when the ears of corn that have been relieved of superfluous trash and objectionable matter while within the hood 39, are deposited upon the husking rolls 51, they are spread over the same, and as the said ears are engaged by the pins carried by the said rolls, the husks are removed in the usual manner and the clean ears fall from the lower ends of the said rolls upon the endless conveyer-belt 68. The said belt 68 carries the said ears up to the trunk 67, and they may fall from the upper end of the said trunk to a wagon-body or other receptacle provided for their reception.

Having described the invention, what is claimed as new is:—

1. In a corn harvester, the combination of stalk-forwarding chains on opposite sides of the stalk passageway, and ear-snapping chains located under the said stalk-forwarding chains.

2. In a corn harvester, the combination of stalk-forwarding chains on opposite sides of the stalk passageway and ear-snapping chains located upon opposite sides of the said passageway and being located under the stalk-forwarding chains.

3. In a corn harvester, the combination of stalk-forwarding chains located upon opposite sides of the stalk passageway and moving in orbits, and ear-snapping chains located upon the opposite sides of the stalk passageway and being located below the said stalk-forwarding chains and moving in orbits.

4. In a corn harvester, ear-snapping chains located on opposite sides of the stalk passageway, stalk-forwarding chains located upon the opposite sides of the stalk passageway, and stalk-engaging rolls located under the upper portions of the said chains.

5. In a corn harvester, the combination of stalk-forwarding chains located upon opposite sides of the stalk passageway, ear-snapping chains located upon opposite sides of the stalk passageway, the said chains being mounted to move in orbits, and the plane of the orbits of the stalk-forwarding chains being at right angles to the plane of the orbits of the ear-snapping chains.

In testimony that we claim the foregoing as our own, we have hereto affixed our signatures in the presence of two witnesses.

DANIEL WANDSCHEER.
JACOB WANDSCHEER.

Witnesses:
ANTHONY TE PASKE,
ED VAN STEENBERGEN.